United States Patent [19]

Ishikawa

[11] Patent Number: 4,700,061

[45] Date of Patent: Oct. 13, 1987

[54] OPTICAL READER

[75] Inventor: Yujiro Ishikawa, Toyoda, Japan

[73] Assignee: Brother Industries, Ltd., Nagoya, Japan

[21] Appl. No.: 799,457

[22] Filed: Nov. 19, 1985

[30] Foreign Application Priority Data

Nov. 20, 1984 [JP] Japan .................................. 59-244831

[51] Int. Cl.[4] .............................. G02B 5/14; H01J 5/16
[52] U.S. Cl. .................................... 250/227; 250/226; 382/50
[58] Field of Search .......................... 250/227; 382/50; 358/80, 75

[56] References Cited

U.S. PATENT DOCUMENTS

| | | | |
|---|---|---|---|
| 3,885,878 | 5/1975 | Ishak | 250/227 |
| 3,922,714 | 11/1975 | Delavie | 250/227 |
| 4,251,837 | 2/1981 | Janeway | 382/50 |
| 4,343,991 | 8/1982 | Fujiwara | 250/227 |
| 4,413,276 | 11/1983 | Hertz | 358/75 |
| 4,461,016 | 12/1985 | Jung | 358/76 |
| 4,490,740 | 12/1984 | Moriguchi | 358/75 |
| 4,547,765 | 3/1987 | Imaijumi | 250/227 |
| 4,556,916 | 12/1985 | Matsunawa | 382/50 |
| 4,597,006 | 6/1986 | Orsburn | 358/80 |
| 4,647,961 | 3/1987 | Kammoto | 358/75 |
| 4,652,743 | 3/1987 | Karano | 250/225 |

FOREIGN PATENT DOCUMENTS

| | | | |
|---|---|---|---|
| 0116819 | 9/1979 | Japan | 358/75 |
| 0030271 | 2/1983 | Japan | 358/75 |
| 0079373 | 5/1983 | Japan | 358/75 |

Primary Examiner—David K. Moore
Assistant Examiner—A. Anne Skinner
Attorney, Agent, or Firm—Kane, Dalsimer, Kane Sullivan and Kurucz

[57] ABSTRACT

A plurality of light emitting elements which are adapted to emit light of three primary colors are activated in a sequential order, and the emitted light is transmitted through a single emission side optical fiber to illuminate an image surface. Reflected light from the image surface is conveyed to a light receiving element through a corresponding receiving side optical fiber. A decision circuit determines whether or not an output from the light receiving element has reached a given level. The sequence of emission from the respective light emitting elements as well as the amount of light emitted therefrom are controlled by control means. When the given level is reached, the associated data is stored to assure a proper reading of the image.

7 Claims, 8 Drawing Figures

|  | Lri | Lyi | Lgi |
|---|---|---|---|
| WHITE | H | H | H |
| RED | H | L | L |
| ORANGE | H | H | L |
| YELLOW | L | H | L |
| YELLOW-GREEN | L | H | H |
| GREEN | L | L | H |
| BLACK | L | L | L |

FIG. 7

OPTICAL READER

BACKGROUND OF THE INVENTION

The invention relates to an optical reader for reading a color image on a document or paper.

A variety of arrangements are proposed in the prior art to provide an optical reader which reads a color image on a paper. For example, Japanese Laid-Open Patent Application No. 162,570/1982 discloses an optical reader including three light emitting elements which emit light of three primary colors respectively, a single lens which transmits the light from the three color light emitting elements to a paper, a light receiving element for receiving reflected light from the paper surface, and a binary digitizing circuit for digitizing an output from the light receiving element into a binary value.

The three primary color emitting elements are energized in a sequential manner, and the light from these elements are transmitted through the lens to illuminate a paper. The reflected light impinges upon the light receiving element, separately for the light from the individual light emitting elements. The binary digitizing circuit determines an output from the light receiving element separately for each color, and the optical reader reads a color image on the paper on the basis of such result of determination. However, in the disclosed apparatus, each light emitting element can be independently adjusted as to an amount of light emitted therefrom, but the specific technique of adjustment is not disclosed.

A plurality of arrangements are available to construct an optical reader which incorporate optical fibers. However, there is no optical reader which is constructed to transmit light from three light emitting elements, which emit light of three primary colors, to the surface of a paper through a single optical fiber.

OBJECT OF THE INVENTION

It is an object of the invention to provide a novel optical reader which is constructed in quite a different manner from the prior art as described above and which greatly facilitates a reading of a color image on a paper while allowing a facilitated adjustment in the amount of light emitted from the light emitting elements.

SUMMARY OF THE INVENTION

The above object is accomplished in accordance with the invention by providing an optical reader comprising: a plurality of emission side fibers having their one end located opposite to read points on a paper; a group of light emitting elements arranged in a manner such that a plurality of light emitting elements which emit light of different colors are disposed in opposing relationship with each of the emission side fibers, the light emitting elements being connected to the other end of each of the emission side fibers; a plurality of receiving side fibers having their one end disposed so as to be opposite to the read points on the paper and functioning to transmit reflected light from the read points therethrough; at least a light receiving element connected to the other end of the receiving side fibers; means for sequentially activating the plurality of light emitting elements in a time sharing scheme so that the plurality of light emitting elements are activated to emit light at least once with respect to one of the read points; and read means for detecting an output from the light receiving element and for examining if the output has reached a given reference value.

In the optical reader described above, digital-to-analog converter means responds to input data by outputting an output signal, which is applied to one of a group of light emitting elements which correspond to a particular color. That light emitting element illuminates a read on the paper through an emission side fiber with an amount of light which corresponds to the input data. Reflected light from the read point impinges upon the light receiving element through a receiving side fiber, and the light receiving element develops a signal having an output value which depends on the magnitude of reflected light, such signal being fed to decision means. The decision means decides whether a particular output value has reached a given reference value for each color, and when the output value has reached the given value, input data which has been supplied to the digital-to-analog converter means is stored in a memory. In this manner, a decision is rendered for each of three light emitting elements in the group. When a color image on the paper is being read, data which is stored in the memory is supplied to the digital-to-analog converter means. In this manner, data stored in the memory is read out in sequence, and as such data is supplied to the digital-to-analog converter means, the signal which is output from the light receiving element has an output value which remains substantially constant for each color.

Further details of the invention will be described in connection with a preferred embodiment thereof shown in the drawings.

DETAILED DESCRIPTION OF EMBODIMENT

Before describing the arrangement of the optical reader according to the invention, a mechanism which is involved with the read operation will be initially described with reference to FIG. 7.

Figure 7:
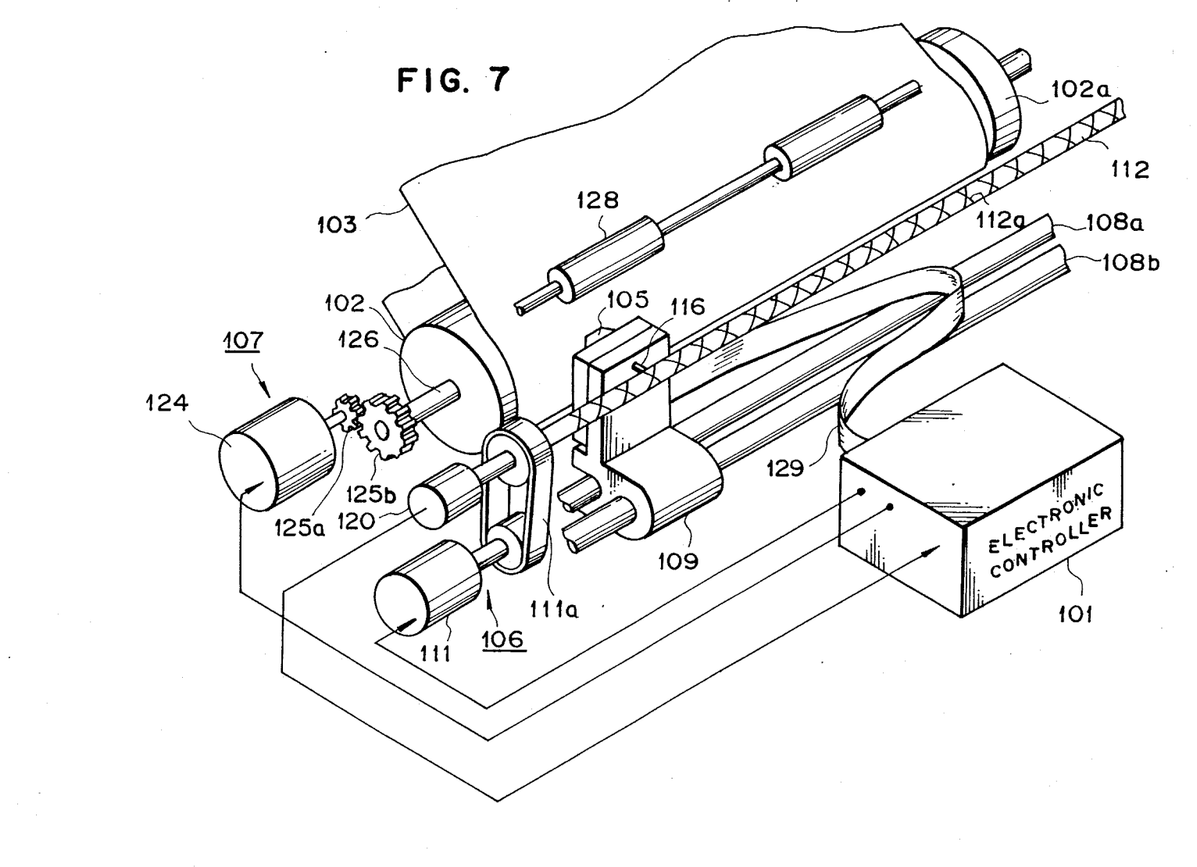
FIG. 7 is a schematic illustration of the mechanical portion of the optical reader.

Referring to FIG. 7, an image on a paper 103 which is loaded around a platen 102 is optically read under the control of an electronic controller 101. A read head 105 of serial type is driven by a head traversing device 106 to move back and forth in a direction of the width of the paper. On the other hand, the paper 103 loaded around the platen 102 is fed by a paper feeder 107 to allow the full area of the paper 103 to be read by the read head 105.

The read head 105 is mounted on a carriage 109 which is slidably supported by a pair of guide shafts 108a, 108b, and is driven for reciprocating movement in the direction of the width of the paper 103 by means of the head traversing device 106. The head traversing device 106 comprises a spiral shaft 112 which is coupled to a DC motor 111 through a belt 111a. A pin 116 projects from the rear surface of the carriage 109 on which the read head 105 is mounted, and engages a spiral cam groove 112a which is formed in the spiral shaft 112, thus allowing the read head 105 to be moved back and forth across the full width of the paper 103 through the rotation of the spiral shaft 112. The travel of the read head 105 is detected by an encoder 120 which is mounted on a shaft that is adapted to be rotated in an integral manner with the spiral shaft 112. A pulse signal from the encoder 120 is fed to the electronic controller 101 to provide a timing signal in the read operation.

When one forwarding stroke or returning stroke of the read head 105 which performs a scanning of the image is completed by the head traversing device 106, the paper 103 is fed a given amount by the paper feeder 107. The paper feeder 107 is driven by a stepping motor 124 having a rotating shaft which is coupled to the rotating shaft 126 of the platen 2 through a pair of spur gears 125a, 125b which mesh with each other. When the carriage 109 having the read head 105 mounted thereon completes its scanning in one direction, the paper 103 which is held down against the platen 2 by means of a paper retaining roller 128 is fed by an amount corresponding to one line in preparation to a next scan or image reading. It is to be noted that a while level check member (white tape) 102a is applied to an end of the platen 102 which is opposite from its drive end.

Figure 1:
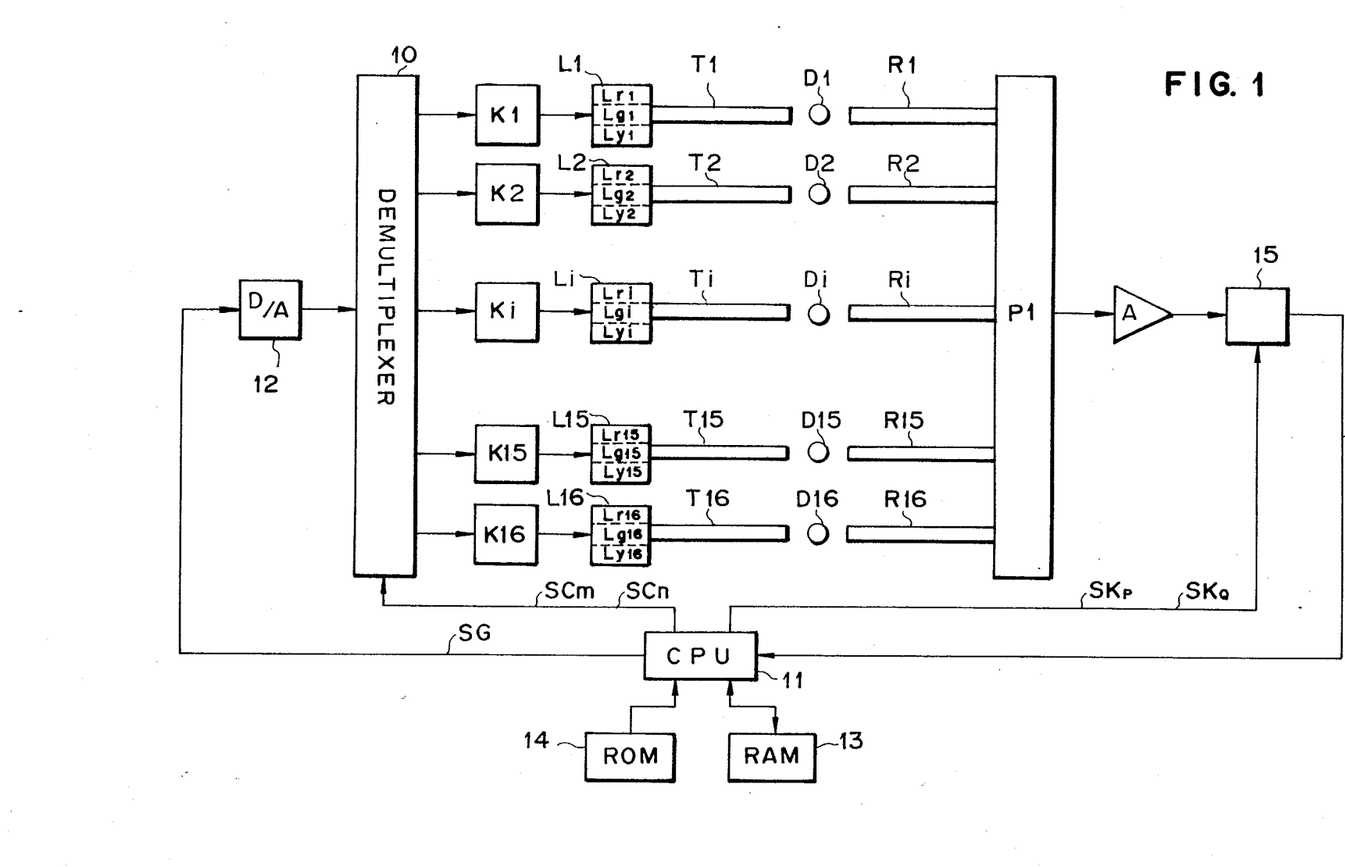
FIG. 1 is a block diagram of one embodiment of the invention.
Figure 2:
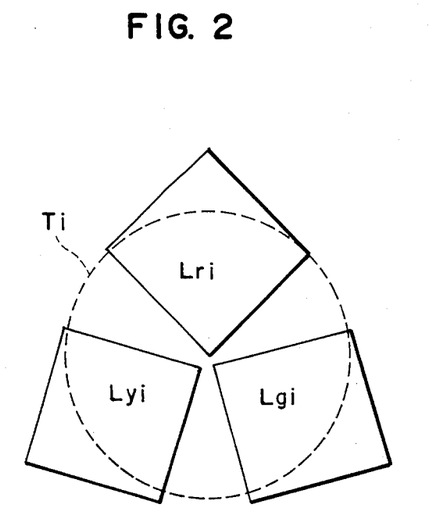
FIG. 2 is an illustration of the relative position of the light emitting elements and the emission side fiber.

Referring to FIG. 1 for describing the construction of the optical reader of the invention, the optical reader includes a group of a first to a sixteenth light emitting elements L1 to L16. Each of the light emitting elements in the group L1 to L16 comprieses three light emitting elements Lri, Lgi and Lyi, where i represents an integer from 1 to 16, each of which produces light of a selected one of three primary colors. As illustrated in FIG. 2, the three light emitting elements Lri, Lgi, Lyi are arranged close to each other so that any light emitted by one of them can be incident on a single emission side fiber Ti. In the present embodiment, the elements Lri, Lgi and Lyi emit light of red, green and yellow color.

The first to the sixteenth light emitting elements L1 to L16 in the group are connected to a first to a sixteenth drive circuit K1 to K16, respectively, which are in turn connected to a demultiplexer 10. The demultiplexer 10 is controlled by control signals SCm and SCn (which are collectively referred to as SC) delivered by a central processing unit (hereafter referred to as CPU) 11. The control signal SCm causes the demultiplexer 10 to select one of the drive circuits Ki while the control signal SCn enables the selected drive circuit Ki to selectively drive one of light emitting elements Lri, Lgi, Lyi in a subgroup of light elements Li.

Figure 4:
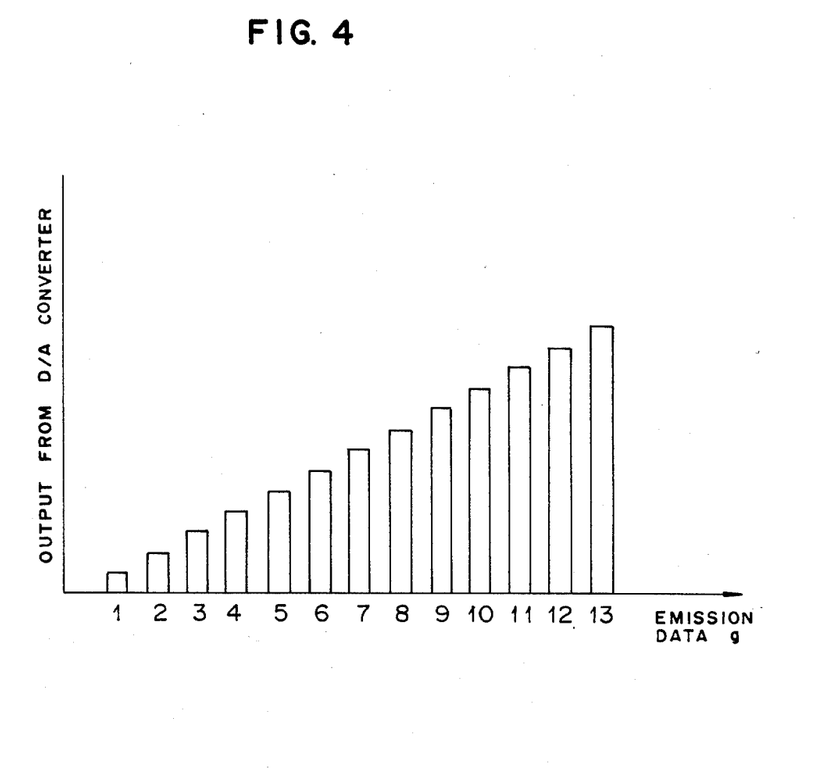
FIG. 4 graphically shows the relationship between the output value from the digital-to-analog converter means and emission data.

CPU 11 is connected to digital-to-analog converter means 12 which operates to convert a digital signal into a corresponding analog value. The converter means 12 is connected to the demultiplexer 10 to feed it with an analog signal which corresponds to emission data signal SG inputted from CPU 11 (see FIG. 4). The analog signal is outputted to a drive circuit Ki, which is selected on the basis of the control signal SCm, through a demultiplexer 10. The drive circuit Ki selects one of the light emitting elements Lri, Lgi, Lyi on the basis of the control signal SCn and applies a signal corresponding to the analog signal to the selected light emitting element Lri, Lgi or Lyi. The selected element then emits light in an amount which corresponds to the analog signal. In this manner, the digital-to-analog converter means 12 controls the amount of light emitted by the respective light emitting elements Lri, Lgi, Lyi based on the emission data signal SG which is supplied from CPU 11.

The group of the first to the sixteenth light emitting elements L1 to L16 are connected to a group of a first to a sixteenth emission side fiber T1 to T16, respectively. The emission side fiber Ti conveys light from the associated light emitting element Lri, Lgi or Lyi to one of read points D1 to D16 on the paper.

A group of a first to a sixteenth receiving side fiber R1 to R16 have their one end located opposite to the paper at respective positions where they can receive reflected light from the read points D1 to D16. The other end of each of the first to the sixteenth receiving side fibers R1 to R16 is connected to a light receiving element P1. In this manner, reflected light from the first to the sixteenth read points D1 to D16 are transmitted to the light receiving element P1 through the first to the sixteenth receiving side fiber R1 to R16. The light receiving element P1 converts the received light into an electric signal which is proportional to the magnitude of the received light, and feeds the signal to an amplifier A. The amplifier A amplifies an input signal and outputs its output signal to decision means 15 which will be described later.

The purpose of controlling the amount of emission from the light emitting elements Lri, Lgi, Lyi by means of the digital-to-analog converter means is to allow the emission from the individual light emitting elements Lri, Lgi, Lyi to be determined so as to achieve a uniform output from the individual channels. Specifically, the optical reader comprises a plurality of optical systems, each including the connection between the light emitting elements Lri, Lgi, Lyi and their associated emission side fiber Ti as well as the connection between the receiving side fiber Ri and the light receiving element P. It will be understood that the conversion efficiency may vary from element to element and also the transmission efficiency may vary from fiber to fiber. Accordingly, an output from the light receiving element may not remain constant due to variations which occur in these optical systems. Hence, a processing which is referred to as a white level check is employed to produce a uniform output from each channel.

Figure 3:
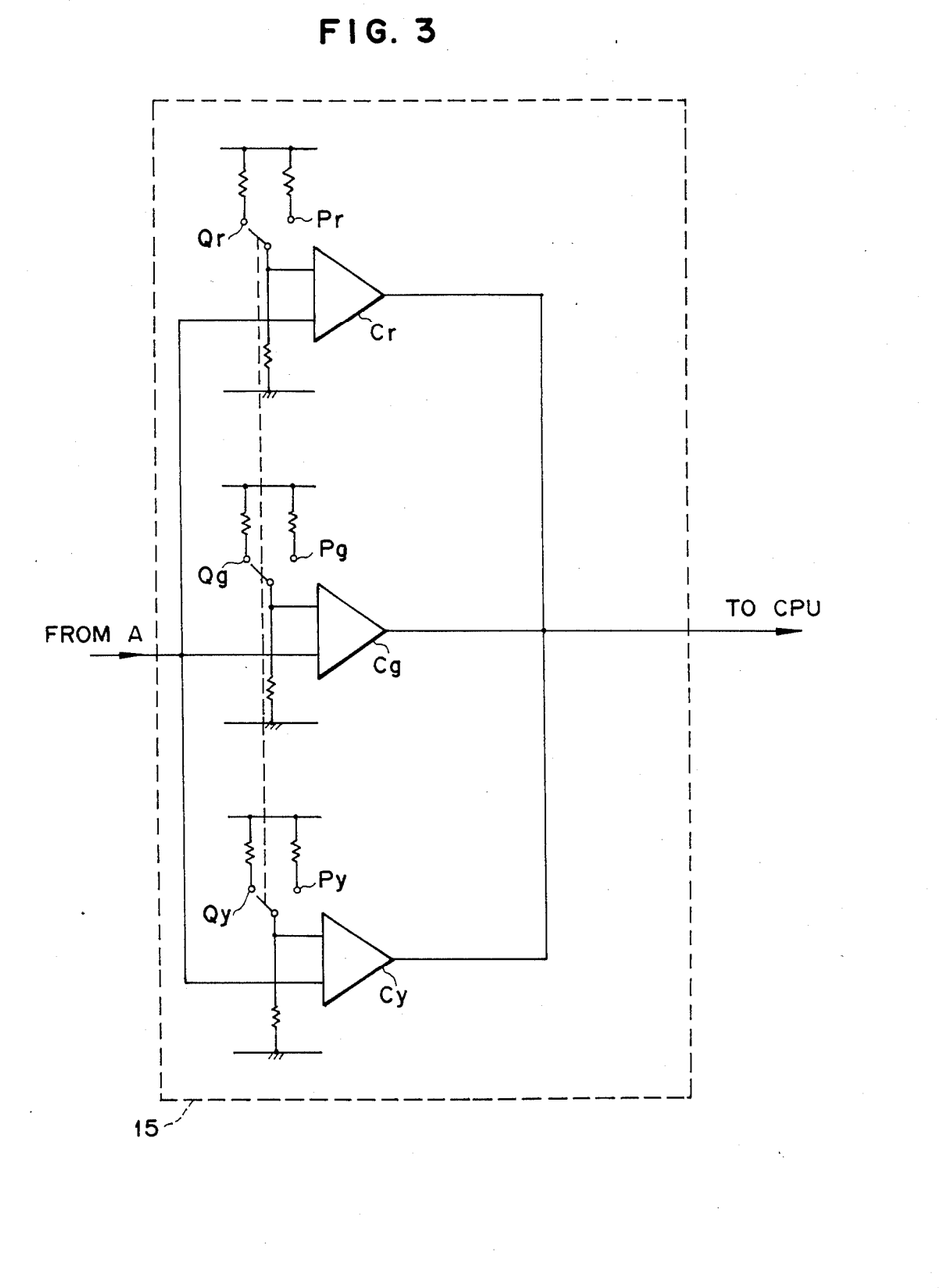
FIG. 3 is a circuit diagram of a decision circuit.

The decision means 15 is illustrated in FIG. 3. As shown, it comprises three comparators Cr, Cg, Cy. In each comparator, a signal from the amplifier A is applied to one input terminal of the comparator, in a separate manner for each color from the three primary color elements Lri, Lgi, Lyi. Thus, a signal from the red light emitting element Lri is applied to the comparator Cr. Similarly, a signal from the green light emitting element Lgi is applied to the comparator Cg, and a signal from the yellow light emitting element Lyi is applied to the comparator Cy. A signal representing white level check reference values Pr, Pg, Py which establish the amount of emission from the individual light emitting elements Lri, Lgi, Lyi or a signal representing threshold values Qr, Qg, Qy for reading a color image on the paper can be selectively applied to the other input of each of the comparators Cr, Cg, Cy. The selection of a particular one of the three comparators Cr, Cg, Cy which is to be operated is controlled by a control signal SKn (n=1 to 3) which is outputted by CPU 11. Specifically, the comparator Cr is operated in response to a control signal SK1 which is outputted from CPU 11. Similarly, the comparator Cg is operated in response to a control signal SK2 which is outputted from CPU 11, and the comparator Cy is operated in response to a control signal SK3 which is outputted from CPU 11.

The selection between the signal representing the reference values Pr, Pg, Py and the signal representing the threshold values Qr, Qg, Qy for application to the other input of the respective comparators Cr, Cg, Cy is controlled by control signals SKP and SKQ which are outputted by CPU 11 (see FIG. 1). Specifically, when the control signal SKQ is outputted, the threshold signals Qr, Qg, Qy may be applied to the comparators Cr, Cg, Cy, respectively. Similarly, when the control signal SKP is outputted, the signal representing the reference values Pr, Pg, Py may be applied to the comparators. When the output signal from the light receiving element P1 is applied to one of the comparators Cr, Cg, Cy and the signal representing one of the reference values Pr, Pg, Py is applied to the other input of the selected comparator Cr, Cg or Cy in response to the control signal SKP, this comparator compares the output signal from the amplifier A against the reference value selected to determine if the output from the light receiving element P1 has reached the given reference value Pr, Pg, or Py for each color as the amount of emission from the light emitting elements Lri, Lgi, Lyi is changed in a manner to be described later. When the magnitude of the output signal exceeds the reference value Pr, Pg, or Py, the selected comparator Cr, Cg or Cy produces a high level signal J which is outputted to CPU 11.

Returning to the description of CPU 11, it comprises a read/write memory (hereafter referred to as RAM) 13 and a read only memory (hereinafter referred to as ROM) 14. Specifically, ROM 14 stores emission data g which constitutes the emission data signal SG, and control data cm, cn, kn, kp, kq which constitute the control signals SCm, scn, SKi, SKP, and SKQ, respectively. RAM 13 stores proper emission data $g_{nm}$ when CPU 11 inputs a high level signal from the comparator. In addition, RAM 13 stores data relating to a color image at the read points D1 to D16 when CPU 11 inputs the signal from the comparator representing the threshold values Qr, Qg, Qy to the comparators Cr, Cg, Cy.

Figure 5A:
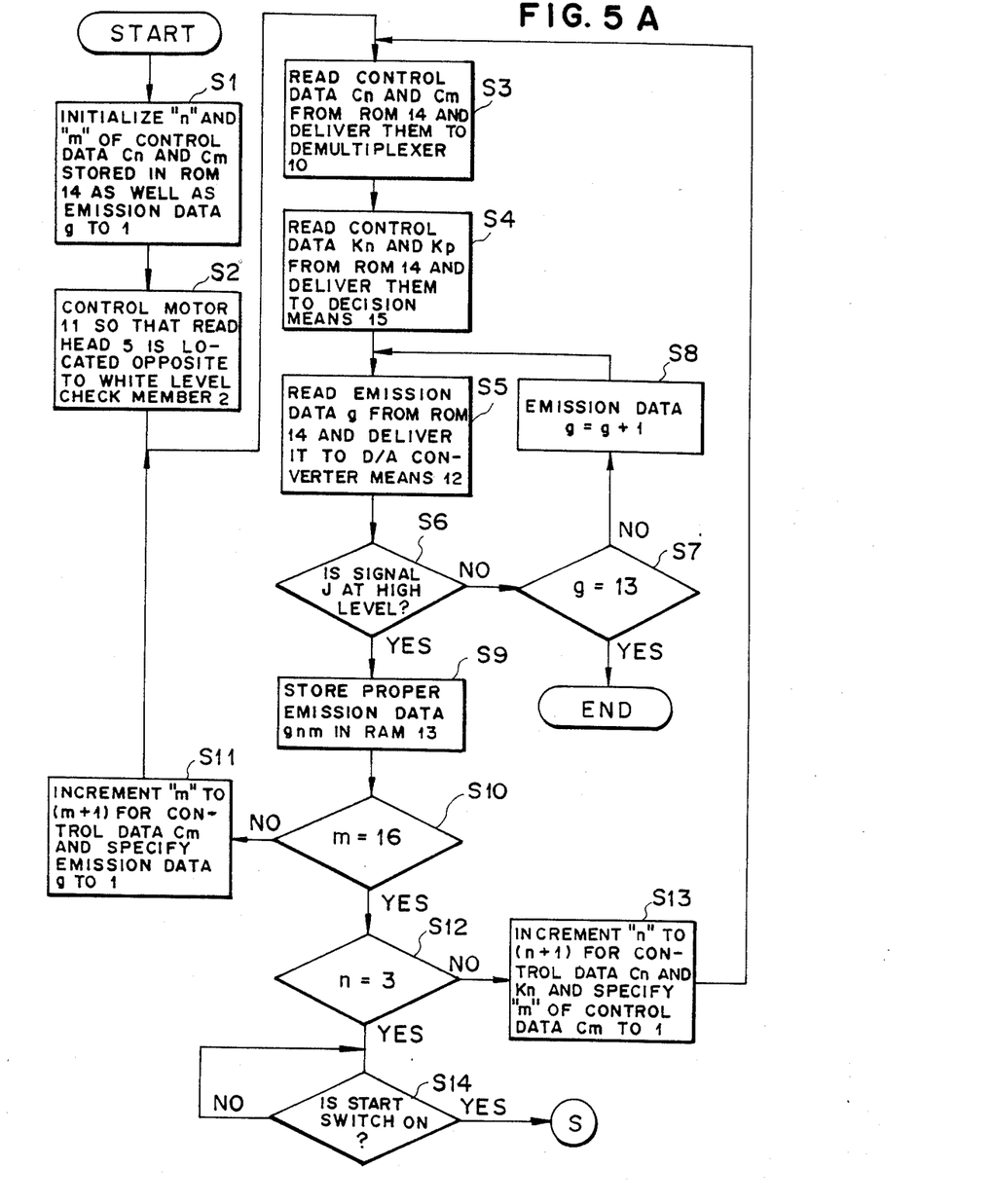
FIGS. 5A and 5B are flow charts illustrating the operation of the embodiment.

When CPU 11 progresses through the steps of a flow chart shown in FIG. 5A using the emission data g and control data cm, cn, kn, kp, kq which are stored in ROM 14, the amount of light emission from the respective light emitting elements Lri, Lgi, Lyi is changed in a sequential manner and separately for each element.

Specifically, CPU 11 executes the operation of steps S1 to S14 shown in the flow chart of FIG. 5A. CPU initializes the emission data g and "n" and "m" of the control data cn, cm and kn to 1 (step S1). CPU 11 then controls the motor 111 so that the read head 105 (FIG. 7) may be positioned opposite to the white level check member 102a (step S2). CPU 11 then reads the control data cn and cm from ROM 14, and delivers them to the demultiplexer 10 (step S3). Control signal SCm (m=1) then controls the demultiplexer 10 so that an output signal from the digital-to-analog converter means 12 inputs to the drive circuit K1. The drive circuit K1 is then controlled by the control signal SCn (n=1) to feed the signal from the converter means 12 to the light emitting element Lri, thus driving it.

CPU 11 then reads control data kn, kp from ROM 14 and deliver them to decision means 15 (step S4). The control data kn (n=1) is associated with the control data cn (n=1). In other words, when the red light emitting element Lri is selected, the comparator Cr in the decision means 15 is selected. Similarly, comparators Cg and Cy are selected when the green and the yellow light emitting element Lgi, Lyi, respectively, are selected.

CPU 11 reads the emission data g from ROM 14, and outputs it to the digital-to-analog converter means 12 (step S5). In this instance, the emission data g shown in FIG. 4 (g=1) is supplied to the digital-to-analog converter means 12, and a signal having a magnitude corresponding to the emission data g (g=1) is supplied to the demultiplexer 10. A corresponding signal is applied to the light emitting element Lri, which then emits light in an amount corresponding to the signal, which light is transmitted through the emission side fiber T1 to illuminate the read point D1. Reflected light from the read point D1 is transmitted through the receiving side fiber R1 to impinge upon the light receiving element P1. An output signal from the element P1 is amplified by the amplifier A1 and is then fed to the comparator Cr in the decision means 15. The comparator Cr compares this signal against a signal which represents the reference value Pr, and produces either a high or a low level signal J which is delivered to CPU 11.

CPU 11 determines the level of the signal J (step S6). If the signal J is at a high level, CPU 11 determines if the emission data g is equal to 13 (step S7). It is to be noted that the emission data g=13 is the maximum data which is stored, in the present example in ROM 14. If the emission data g is equal to 13, CPU 11 determines that a failure has occurred within the optical reader since the signal J is not at its high level, thus exiting from the flow chart. If the emission data g is not equal to 13, CPU 11 increments the emission data to (g+1) (step S8). In the present example, the emission data g is now equal to 2. CPU 11 then reads the emission data g from ROM 14, and outputs it to the digital-to-analog converter means 12 (step S5). The described operation is then repeated, and CPU 11 determines if the signal J is at its high level (step S6). Subsequently, the steps S5 to S8 are repeated until CPU 11 finds that the signal J is at its high level. Thereupon, CPU 11 stores the proper emission data $g_{nm}$ in RAM 13. CPU 11 then determines if "m" in the control data cm is equal to 16 (step S10). If "m" in the control data cm is not equal to 16, CPU 11 increments "m" of the control data cm to (m+1) and specifies the emission data g to be equal to 1 (step S11). In the present example, CPU 11 increments "m" of the control data cm to 2. CPU 11 then reads control data cn and cm from ROM 14, which are outputted to the demultiplexer 10 (step S3). In the present instance, "n" of the control signal SCn is equal to 1 and "m" of the control signal SCm is equal to 2, and hence the signal which is outputted from the analog-to-digital converter means 12 is applied to the light emitting element Lr2 through the drive circuit K2. By repeating the operations of the steps S4 to S9 mentioned above, CPU 11 causes the proper emission data $g_{12}$ which produces a proper amount of emission from the light emitting element Lr2 to be stored in RAM 13. Subsequently, CPU 11 repeats the operations of the steps S3 to S11 until "m" of the proper emission data·cm becomes equal to 16, thus storing the proper emission data $g_{1i}$ which causes a proper amount of emission from all of the red light emitting elements Lri in RAM 13.

When "m" of the emission data cm is equal to 16, CPU 11 determines if "n" of the control data cn is equal to 3 (step S12). If "n" of the control data cn is not equal to 3, CPU 11 increments "n" of the control data cn is not equal to 3, CPU 11 increments "n" of the control data cn and kn to (n+1), and also specifies "m" of the control data cm to be 1 (step S13). CPU 11 then repeats the operations of the steps S3 to S13 until "n" of the control data cn is equal to 3. In this manner, the proper emission data $g_{2i}$ and $g_{3i}$ which causes a proper amount of emission from the green and yellow light emitting elements Lgi, Lyi are stored in RAM 13. When "n" of the control data cn is equal to 3, CPU 11 waits for a start switch to be turned on which initiates a reading of a color image on the paper (step S14). In the manner mentioned above, the proper emission data $g_{nm}$ which causes a proper amount of emission from the light emitting elements Lri, Lgi, Lyi are established.

Figure 5B:
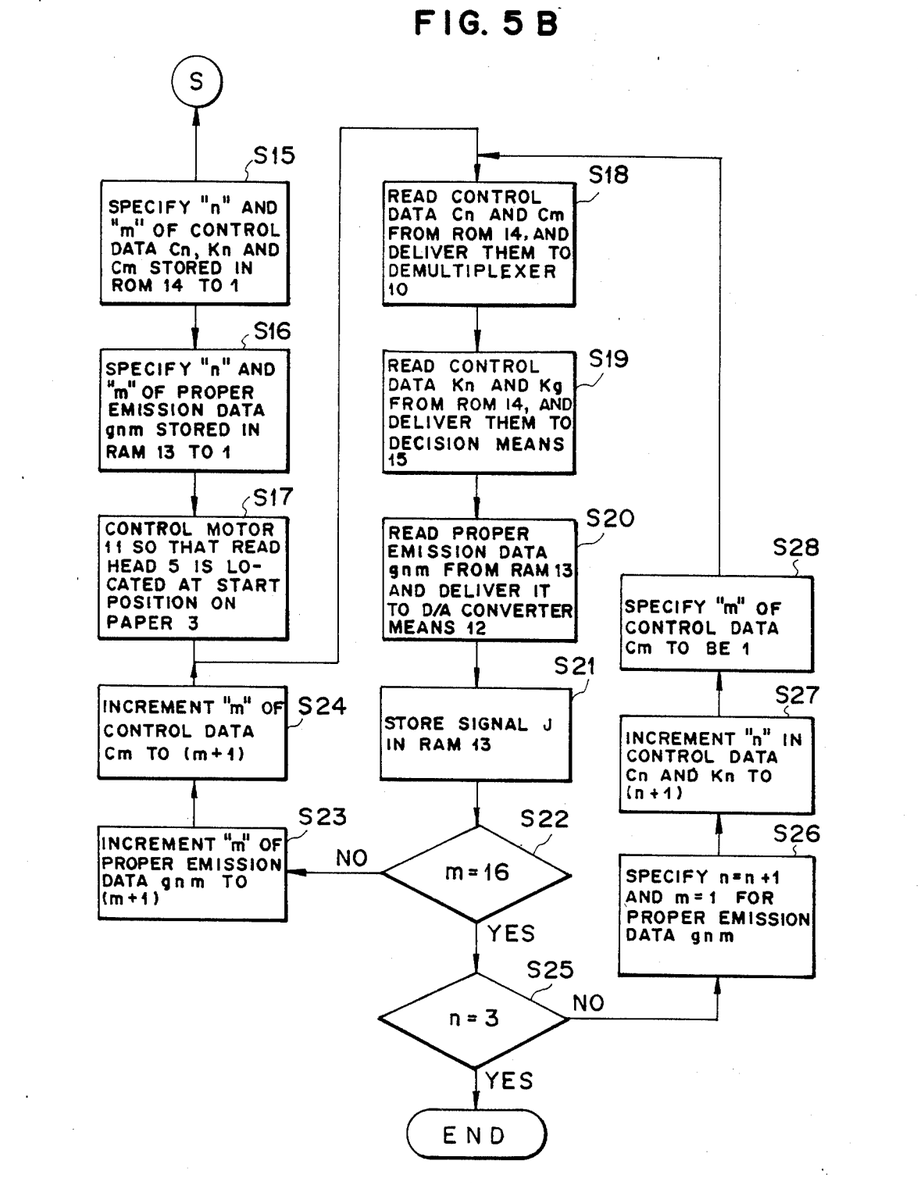

A reading operation to read a color image on the paper using the proper emission data $g_{nm}$ will now be described with reference to a flow chart shown in FIG. 5B.

Initially, CPU 11 specifies 1 "n" and "m" of the control data cn, kn, cm which are stored in ROM 14 (step S15). CPU 11 then specifies 1 for "n" and "m" of the proper emission data $g_{nm}$ which is stored in RAM 13 (step S16). CPU 11 then controls the DC motor 11 so that the read head 5 is located at a start position for reading an image on the paper 3 (step S17). CPU 11 reads control data cn and cm, which are outputted to the demultiplexer 10 (step S18). Since now "n" and "m" of the control data cn and cm are equal to 1, the signal which is outputted from the digital-to-analog converter means 12 is supplied to the drive circuit K1, which then drives the red light emitting element Lr1. CPU 11 reads the control data kn, kq from ROM 14, which are outputted to the decision means 15 (step S19). Accordingly, the comparator Cr for the red color is activated, with a signal representing the threshold value Qr applied to one input thereof.

CPU 11 reads the proper emission data $g_{nm}$ from RAM 13, which is outputted to the digital-to-analog converter means 12 (step S20). The red light emitting element Lr1 is allowed to emit light in a proper amount, which is used to illuminate the read point D1 through the emission side fiber T1. Reflected light from the read point D1 is transmitted through the receiving side fiber R1 to impinge upon the light receiving element P1. An output signal from the element P1 is amplified by the amplifier A, the output signal of which is supplied to the comparator Cr in the decision means 15. The comparator Cr compares this signal against a signal which represents the threshold value Qr, and outputs a signal J to CPU 11. Under this situation, if an image exists in the read point D1 having a color which is close to the red color or which is a white color, the comparator Cr outputs a high level signal J. Otherwise, the comparator Cr outputs a low level signal J. CPU 11 causes the signal J to be stored in RAM 13 (step S21).

CPU 11 determines if "m" of the control data cm is equal to 16 (step S22). If "m" of the control data cm is not equal to 16, CPU 11 increments "m" of the proper emission data $g_{nm}$ by 1 (step S23), and also increments "m" of the control data cm by 1 (step S24). Now n=1 and m=2 for the proper emission data $g_{nm}$, and m=2 for the control data cm. As a result of the execution of the steps S18 to S21 by CPU 11, the red light emitting element Lr2 emits a proper amount of red light, which is transmitted through the emission side fiber T2 to illuminate the read point D2. Reflected light from the read point D2 impinges upon the light receiving element P1 through the receiving side fiber R2. An output from the element P1 is amplified by the amplifier A and is then inputted to the comparator Cr. The comparator Cr compares this signal against a signal which represents the threshold value Qr, and outputs a signal J to CPU 11. In this manner, any image having a color close to the red color or a white color which may be laid at the read point D2 can be read by CPU 11.

The described operations are then repeated until "m" of the control data cm is equal to 16, whereupon an image on the read points D1 to D16 is read.

CPU 11 determines it "n" of the control data cn is equal to 3 (step S25). If "n" of control data cn is not equal to 3, it increments "n" by 1 and specifies 1 for "m" of proper emission data $g_{nm}$ (step S26). CPU 11 increments "n" of control data cn and kn (step S27) and specifies 1 for "m" of control data cm (step S28). In the present example, n=1 and m=2 for the proper emission data $g_{nm}$, and n=2 for the control data cn. When CPU 11 executes steps S18 to S24, the green light emitting elements $L_{g1}$ to $L_{g16}$ emit light in a sequential manner, and an image on the read points D1 to D16 is read in the manner mentioned above. When n is equal to 3 for the control data cn, kn and the proper emission data $g_{nm}$, CPU 11 executes the steps S3 to S11. In the same manner as mentioned above, the yellow light emitting elements Ly1 to Ly16 are sequentially activated to emit light, thus reading any image having a color close to the yellow color or a white color which may be laid at the read points D1 to D16.

Figure 6:
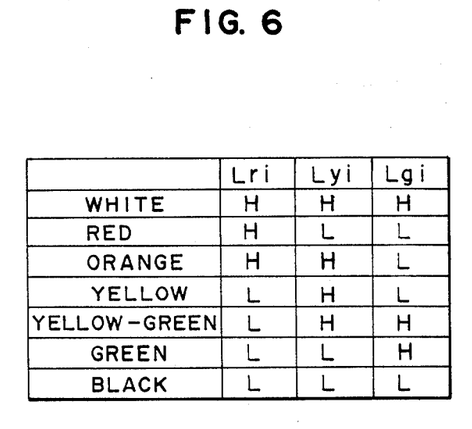
FIG. 6 is a chart indicating the correspondence between output signals from the comparator and the colors on the paper.

When CPU 11 determines that "n" of the control data cn and kn is equal to 3, it determines that the read points D1 to D16 have been sequentially illuminated by red, green and yellow light from the light emitting elements Lri, Lgi, Lyi and the reading of a color image has been completed. It will be understood that the particular color of a color image which is laid at a read point can be determined from a combination of signals which are outputted from the comparators Cr, Cg, Cy, as illustrated by a correlation chart of FIG. 6. In the present embodiment, the optical reader has read a color image on the paper in seven colors. However, as a further embodiment, red, blue and yellow light emitting elements may be employed to enable a color image to be read in eight colors.

From the foregoing, it will be appreciated that the optical reader of the invention is constructed in a manner quite distinct from any conventional optical reader while facilitating a reading of a color image on the paper and while facilitating an adjustment of the amount of light emitted by individual light emitting elements.

While there has been described a preferred form of the invention, obviously modifications and variations such as at least three color reading by using the light emitting elements of red and green, are possible in light of the above teaching.

What is claimed is:

1. An optical reader comprising:
   a plurality of emission side fibers having one end located opposite to read points on a paper;
   a group of light emitting elements arranged in a manner such that a plurality of light emitting elements which emit light of different colors are disposed in opposing relationship with each of the emission side fibers, the light emitting elements being connected to the other end of each of the emission side fibers;

a plurality of receiving side fibers having one end disposed so as to be opposite to the read points on the paper and functioning to transmit reflected light from the read points therethrough;

at least a light receiving element connected to the other end of the receiving side fibers;

means for sequentially activating the plurality of light emitting elements in a time sharing scheme so that the plurality of light emitting elements are activated to emit light at least once with respect to one of the read points;

and read means for detecting an output from the light receiving element and for examining if the output has reached a given reference value.

2. An optical reader according to claim 1 in which the plurality of light emitting elements comprise two light emitting elements which emit light of different colors so that a read point on the paper may be read by separation into at least three colors.

3. An optical reader according to claim 1 in which the plurality of light emitting elements comprise three light emitting elements which emit light of different colors so that a read point on the paper can be read by separation into at least eight colors.

4. An optical reader comprising:

a plurality of emission side fibers having one end disposed in opposing relationship with read points on a paper;

a group of light emitting elements connected to the other end of each of the emission side fibers and arranged such that a plurality of light emitting elements which emit light of different colors are disposed in opposing relationship with a single one of the emission side fibers;

a plurality of receiving side fibers having one end disposed in opposing relationship with the read points on the paper for transmitting reflected light from the read points therethrough;

at least a light receiving element connected to the other end of the receiving side fibers;

digital-to-analog converter means for controlling the light emission of each of the light emitting elements in accordance with inputted data;

means for changing input data supplied to the digital-to-analog converter means to change the amount of light emitted by each of the light emitting elements;

decision means for detecting an output from the light receiving element to determine if an output from the light receiving element has reached a given reference value associated with each color as the amount of light emitted by the respective light emitting elements is changed;

memory means for storing input data supplied to the digital-to-analog converter means when said input data has reached the reference value, the memory means storing such input data separately for each of the light emitting elements;

and means for reading stored data from the memory means as an image on the paper is to be read and for supplying the data read out to the digital-to-analog converter means.

5. An optical reader comprising:

a plurality of emission side fibers having one end disposed in opposing relationship with read points on a paper;

a group of light emitting elements connected to the other end of the emission side fibers and arranged such that a plurality of light emitting elements which emit light of different colors are disposed in opposing relationship with a single one of the emission side fibers;

a plurality of receiving side fibers having one end disposed in opposing relationship with the read points on the paper for transmitting reflected light from the read points therethrough;

at least a light receiving element connected to the other end of the receiving side fibers;

digital-to-analog converter means for controlling the emission of light from the individual light emitting elements based on input data;

means for changing input data supplied to the digital-to-analog converter means to thereby change the amount of light emitted from each of the light emitting elements in a sequential manner;

decision means for detecting an output from the light receiving element to determine if the output from the light receiving element has reached a given reference value associated with each color as the amount of light emitted from the respective light emitting elements is changed;

memory means for storing input data supplied to the digital-to-analog converter means when said input data has reached the reference value, the memory means storing such input data separately for each light emitting element;

means for sequentially reading stored data from the memory means as an image on the paper is to be read and for delivering the data read out to the digital-to-analog converter means in a sequential manner;

means for activating the plurality of light emitting elements sequentially and in a time sharing scheme so that the plurality of light emitting elements are activated at least once for a single one of the read points based on an output from the digital-to-analog converter means;

read means for detecting an output from the light receiving element to determine if the output has reached a given value associated with each color;

and image data memory means for storing a detection output from the read means separately for each read point and separately for each of the plurality of light emitting elements.

6. An optical reader according to claim 5 in which the means for sequentially changing the amount of light emitted from the respective light emitting elements includes second memory means which stores a plurality of predetermined emission data which are arranged in an incremental manner, and output means for successively delivering the plurality of emission data.

7. An optical reader according to claim 4 or 5 in which the decision means includes a plurality of comparators which are successively switched into operation in accordance with a control signal that is associated with another control signal which specifies the sequence of emission from the plurality of light emitting elements.

* * * * *